United States Patent
Pairone et al.

(10) Patent No.: US 6,302,403 B1
(45) Date of Patent: Oct. 16, 2001

(54) SEALING ASSEMBLY FOR TWO MECHANICAL MEMBERS CONNECTED FOR RELATIVE ROTATION, IN PARTICULAR FOR TWO RINGS OF A ROLLING BEARING

(75) Inventors: Gianfranco Pairone, Turin; Fabrizio Avaro, Osasco; Mario Micca, Turin, all of (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 09/425,964

(22) Filed: Oct. 25, 1999

(30) Foreign Application Priority Data

Oct. 23, 1998 (IT) ............................................... TO98A0904

(51) Int. Cl.[7] ...................................................... F16J 15/32
(52) U.S. Cl. ............................ 277/560; 277/561; 277/569
(58) Field of Search .................................... 277/549, 560, 277/561, 562, 564, 567, 569, 648, 649

(56) References Cited

U.S. PATENT DOCUMENTS

| | | |
|---|---|---|
| 2,856,208 | 10/1958 | Cobb . |
| 3,642,335 | 2/1972 | Takahashi et al. . |
| 4,505,484 | 3/1985 | Ohkuma et al. . |
| 4,772,138 | * 9/1988 | Dreschmann et al. ........... 277/562 X |
| 5,860,748 | * 1/1999 | Okumura et al. ................ 277/562 X |
| 5,909,880 | * 6/1999 | Waskiewicz .......................... 277/561 |

FOREIGN PATENT DOCUMENTS

| | | |
|---|---|---|
| 0 198 324 | 10/1986 | (EP) . |
| 0 846 900 | 6/1998 | (EP) . |

* cited by examiner

*Primary Examiner*—Robert J. Sandy
*Assistant Examiner*—Karlena D. Schwing
(74) *Attorney, Agent, or Firm*—Burns, Doane, Swecker & Mathis, L.L.P.

(57) ABSTRACT

A sealing assembly for two mechanical members connected for relative rotation; a first mechanical member is fitted integrally with a substantially rigid shield, from which projects radially an annular sealing member having, on a respective first annular face, a first and a second axial sealing lip, both cooperating in sliding manner with a sealing surface of a second mechanical member; when the first annular face of the annular sealing member is subjected to a pressure substantially equal to the pressure on a second annular face, opposite the first, of the annular sealing member, only the first lip cooperates in sliding manner with the sealing surface, and the second lip mates, with no interference, with the sealing surface to permit fluid passage; conversely, when the first annular face is subjected to a pressure significantly lower than the pressure on the opposite second annular face, the annular sealing member is deformed elastically so that the second lip also cooperates in sliding manner with the sealing surface.

11 Claims, 2 Drawing Sheets

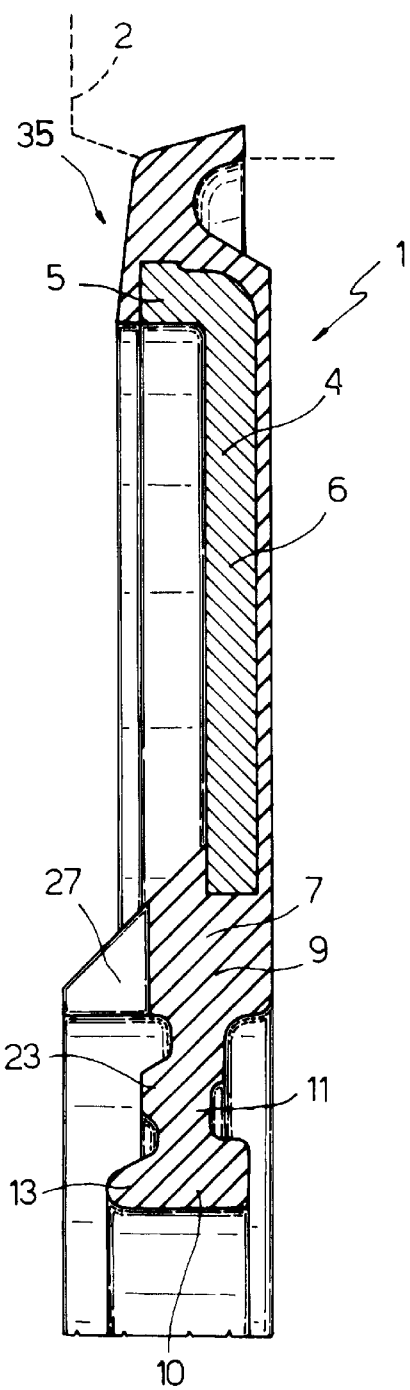
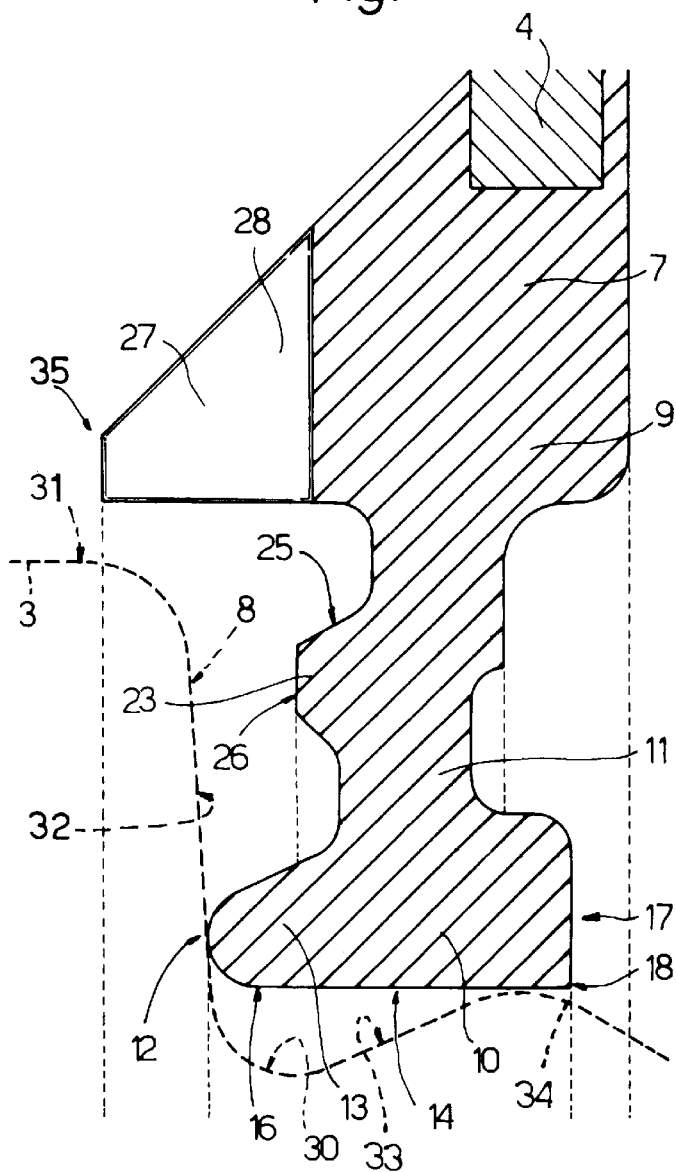

SEALING ASSEMBLY FOR TWO MECHANICAL MEMBERS CONNECTED FOR RELATIVE ROTATION, IN PARTICULAR FOR TWO RINGS OF A ROLLING BEARING

The present invention relates to a sealing assembly for two mechanical members connected for relative rotation, e.g. the two rings of a rolling bearing.

BACKGROUND OF THE INVENTION

A major problem posed by sealing assemblies for rotary members is overheating of sliding-contact sealing members, especially at high rotation speeds which bring about fairly rapid wear of the sealing members.

Currently available sealing members of this type fail to provide a satisfactory solution to the problem. In particular, though various solutions are known which provide for lubricating the sliding lips, e.g. using the same lubricant as for the members connected for relative rotation, such solutions invariably involve considerable in-service lubricant leakage, besides failing to maintain long-term efficiency of the sliding members and prevent the entry of external contaminating substances.

SUMMARY OF THE INVENTION

It is an object of the present invention to eliminate the aforementioned drawbacks of known sealing assemblies for rotary members by providing, in particular, a sealing assembly which, though cheap and easy to produce, provides for effectively lubricating, cooling, and maintaining long-term efficiency of the sealing member, for minimizing lubricant leakage, and for effectively excluding contaminating substances, especially under heavy-duty working conditions.

According to the present invention, there is provided a sealing assembly for two mechanical members connected for relative rotation, in particular for two rings of a rolling bearing, comprising a substantially rigid shield carried integrally by a first of said mechanical members, and an annular sealing member projecting radially from said shield and in turn comprising a first and a second axial sealing lip, both projecting axially from a first annular face of said annular sealing member and cooperating in sliding manner with a sealing surface, substantially facing said first annular face, of a second of said mechanical members;

characterized in that said annular sealing member is elastically deformable to selectively assume a first operating position when said first annular face of said annular sealing member is subjected to a pressure substantially equal to the pressure on a second annular face, opposite said first annular face, of said annular sealing member, and a second operating position when said first annular face is subjected to a pressure significantly lower than the pressure on said second annular face; in said first operating position, said first lip mating with a given amount of axial interference with said sealing surface, and said second lip mating with substantially no axial interference with said sealing surface to permit fluid passage between said second lip and said sealing surface; and, in said second operating position, said second lip also being caused by deformation of said annular sealing member to cooperate in sliding manner and with a given amount of axial interference with said sealing surface.

The sealing assembly according to the invention is cheap and easy to produce, provides for effectively lubricating, cooling and maintaining long-term efficiency of the sliding-contact sealing member, significantly reduces lubricant leakage, and improves the ability of the sealing member to exclude contaminants in particularly heavy-duty working conditions.

BRIEF DESCRIPTION OF THE DRAWINGS

A non-limiting embodiment of the present invention will be described by way of example with reference to the accompanying drawings, in which:

FIG. 1 shows a radial section of a sealing assembly in accordance with the invention;

FIG. 2 shows a larger-scale view of a detail of the FIG. 1 sealing assembly in an intermediate assembly position;

DETAILED DESCRIPTION OF THE INVENTION

Figure 3:
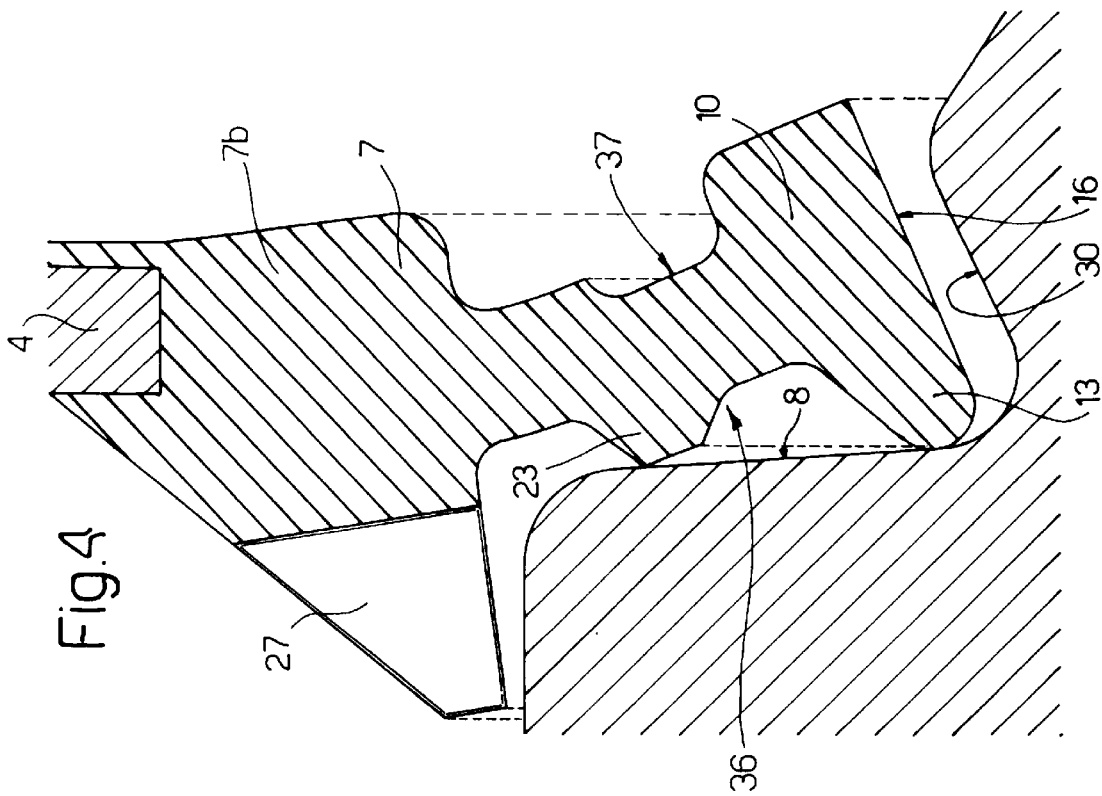
FIGS. 3 and 4 show operation of the sealing assembly according to the invention.

With reference to FIGS. 1 and 2, number 1 indicates a sealing assembly for two mechanical members 2 and 3 connected for relative rotation and defined respectively, in the non-limiting embodiment shown in FIGS. 1 and 2, by a first and second ring of a rolling bearing (substantially known and not shown for the sake of simplicity). In the following description, purely by way of example, first ring 2 of the bearing will be assumed stationary and radially outwards, and second ring 3 rotating and radially inwards.

Sealing assembly 1 comprises a substantially rigid shield 4 carried integrally by and fitted in substantially known manner to ring 2 (e.g. via the interposition of a portion of elastomeric material). More specifically, shield 4 comprises a cylindrical portion 5, and a radially inner flange 6.

Sealing assembly 1 also comprises an elastically deformable annular sealing member 7, e.g. made of elastomeric material, which projects radially from shield 4 and, in use, cooperates in sliding manner with a sealing surface 8 of inner ring 3 practically perpendicular, in the example shown, to the relative rotation axis of rings 2, 3.

Annular sealing member 7 is substantially T-shaped, and comprises a root portion 9 projecting radially from (and secured, e.g. co-molded, in known manner to) a free-end edge of flange 6 of shield 4; an end portion 10 projecting axially from a free radial end 14 of annular sealing member 7; and an intermediate portion 11 extending radially between root portion 9 and end portion 10 and connected integrally to root portion 9 by a narrow section defining an elastically deformable virtual hinge. In the example shown, end portion 10 projects axially on opposite sides of free radial end 14 of sealing member 7, and has a longer axial extension than intermediate portion 11. A rounded first axial end 12 of end portion 10, facing sealing surface 8 of ring 3, defines a first axial sealing lip 13 which, in use, cooperates in sliding manner with sealing surface 8 of ring 3.

End portion 10 of annular sealing member 7 also comprises a circumferential radial-end edge 16 which, when undeformed, is defined by a cylindrical surface substantially coaxial with the relative rotation axis of rings 2, 3.

At a second axial end 17 opposite rounded first axial end 12, end portion 10 has a sharp annular edge 18, e.g. of about 90°.

In the preferred embodiment shown in FIGS. 1 and 2, annular sealing member 7 also comprises a second axial sealing lip 23 projecting axially towards sealing surface 8 of ring 3 from intermediate portion 11 of annular sealing member 7 and defined by an annular edge in turn defined by two converging annular sides 25, 26. When undeformed, annular side 26 is substantially perpendicular to the relative rotation axis of rings 2, 3 and, therefore, to the circumferential edge 16 of annular sealing member 7.

Annular sealing member 7 also comprises an annular spur 27 projecting axially from root portion 9 towards sealing surface 8 of ring 3. Annular spur 27 is located radially on the opposite side of second lip 23 to first lip 13, and comprises a pair of diametrically opposite radial slits 28 for the passage of fluid through the spur itself.

Ring 3 has a circumferential seat 30 defined, in the example shown, by a circumferential groove formed in a radially outer lateral surface 31 of ring 3. A substantially flat, annular side 32 of circumferential seat 30 defines sealing surface 8, while a bottom surface 33 of circumferential seat 30, radially facing circumferential edge 16 of first lip 13, comprises a shaped projection 34, so that bottom surface 33, in radial section, has an undulated, substantially S-shaped contour blending with sealing surface 8.

Annular spur 27 is preferably located inside a cavity 35 defined between rings 2, 3, and at least partially extends axially beyond sealing surface 8 so as to be positioned substantially facing, a given distance from, and substantially coaxial and concentric with lateral surface 31 of ring 3. Cavity 35 contains a lubricating fluid (oil or grease) and is closed by annular sealing member 7.

Figure 4:
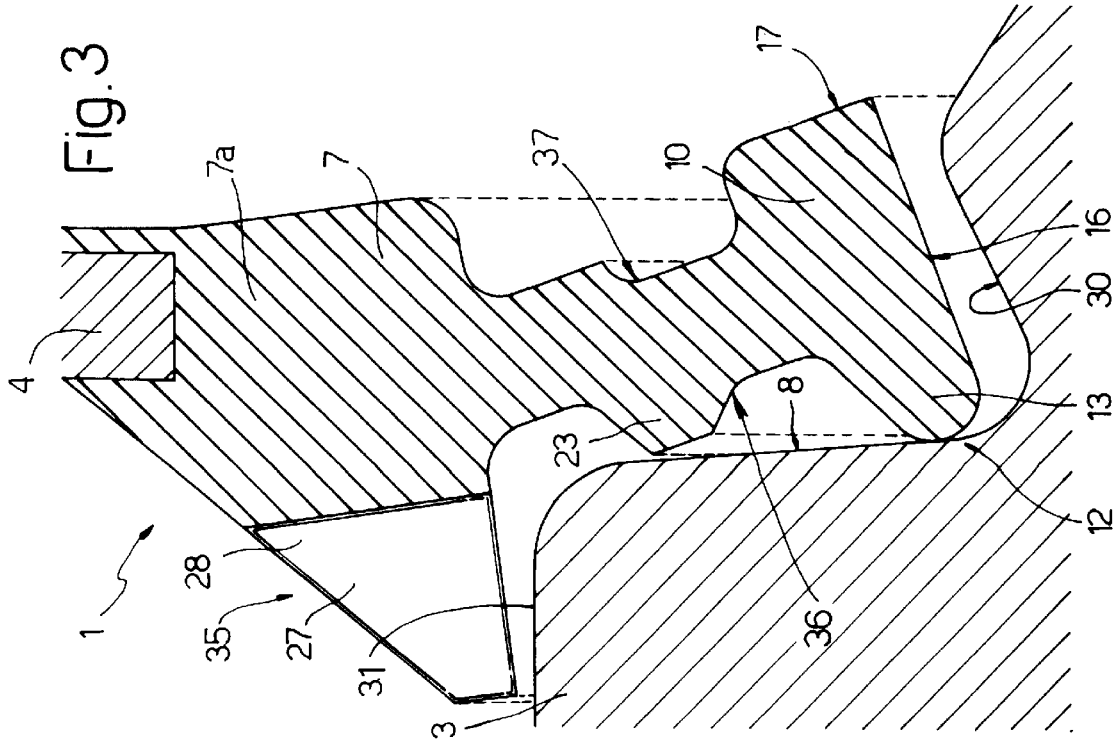

With reference also to FIGS. 3 and 4, in which any details similar to or identical with those already described are indicated using the same reference numbers, sealing assembly 1 according to the invention is assembled with lip 13 mating with a given amount of axial interference with sealing surface 8; lip 23 mates with sealing surface 8 with substantially no interference (i.e. with a small axial clearance) to permit fluid passage between sealing surface 8 and lip 23; and annular spur 27 is positioned facing and a small radial distance from lateral surface 31 of ring 3, so that annular sealing member 7 is positioned as a whole in a first operating position 7a (FIG. 3) wherein only lip 13 cooperates in fluidtight manner with sealing surface 8, while lip 23 permits fluid passage, in particular the passage of lubricating fluid, from cavity 35 towards lip 13.

Also in actual use, annular sealing member 7 is maintained substantially in operating position 7a as long as opposite annular faces 36, 37 of annular sealing member 7 are subjected to substantially equal pressures.

In the above operating condition, annular spur 27 has, in known manner, a centrifugal effect inside cavity 35 on the lubricating fluid, which is thus at a predetermined pressure; and, at the same time, radial slits 28 enable lubricating fluid to flow towards, and so lubricate, lips 13, 23. The lubricating fluid flowing through radial slits 28, in fact, flows between lip 23 and sealing surface 8, which, mating with no interference, substantially define, in the above operating condition, a labyrinth seal (as opposed to a sliding seal), so that the lubricating fluid also flows towards, and lubricates, lip 13.

According to the invention, annular sealing member 7 is elastically deformable to also assume, in use, a second operating position 7b (FIG. 4) when the pressure on annular face 36, facing sealing surface 8 and therefore also cavity 35 containing the lubricating fluid, is significantly less than the pressure on the opposite annular face 37. In which case, annular sealing member 7, in particular portions 10 and 11, is so deformed elastically as to also cause lip 23 to interfere with sealing surface 8, so that, in operating position 7b, lip 23 mates with a given amount of axial interference with, and so cooperates in sliding manner with, sealing surface 8.

According to the invention, therefore, annular sealing member 7 is elastically deformable to selectively assume operating positions 7a and 7b according to the difference in the pressures on annular faces 36, 37. That is, in the event of a pressure difference over and above a predetermined value occurring in operating position 7a—wherein both annular faces 36, 37 are subjected to substantially the same pressure and only lip 13 cooperates in sliding manner with sealing surface 8—annular sealing member 7 is deformed elastically so that lip 23 also cooperates in sliding manner with sealing surface 8. With both lips 13, 23 cooperating interferentially with sealing surface 8, sealing member 7 is thus better able to prevent the entry of contaminating substances between itself and sealing surface 8.

The difference in the pressures on annular faces 36, 37 which causes lip 23 to cooperate interferentially with sealing surface 8 may be selected by appropriately sizing portions 10 and 11 of annular sealing member 7, and using appropriately deformable elastomers.

Clearly, changes may be made to the sealing assembly as described herein without, however, departing from the scope of the accompanying claims.

What is claimed is:

1. A sealing assembly for two mechanical members connected for relative rotation, comprising:

a substantially rigid shield adapted to be carried integrally by a first of said mechanical members;

an annular sealing member projecting radially from said shield and comprising a first axial sealing lip and a second axial sealing lip, said first and second axial sealing lips both projecting axially from a first annular face of said annular sealing member that is adapted to substantially face a sealing surface provided on a second of said mechanical members, said first and second axial sealing lips being adapted to cooperate in a sliding manner with the sealing surface;

said annular sealing member comprising a root portion projecting radially from said shield, an end portion projecting axially at a free radial end of said annular sealing member, and an intermediate portion extending radially between said root portion and said end portion, said intermediate portion being connected to said root portion by a narrow section defining one elastically deformable virtual hinge;

said annular sealing member being substantially T-shaped, said end portion projecting axially on opposite sides of said free radial end of said annular sealing member and having an axial extension greater than the axial extension of said intermediate portion of said annular sealing member;

said first axial sealing lip being defined by a rounded first axial end of said end portion of said annular sealing member, said second axial sealing lip projecting axially from said intermediate portion of said annular sealing member;

said elastically deformable virtual hinge allowing said annular sealing member to selectively assume a first operating position when said first annular face of said annular sealing member is subjected to a pressure substantially equal to the pressure on a second annular face of said annular sealing element that is opposite said first annular face of said annular sealing member, and a second operating position when said first annular face is subjected to a pressure significantly lower than the pressure on said second annular face;

wherein in the first operating position said first axial sealing lip is adapted to mate with the sealing surface with a given amount of axial interference while said second axial sealing lip is adapted to mate with the sealing surface with substantially no axial interference to permit fluid passage between said second axial sealing lip and said sealing surface, and in the second operating position said second axial sealing lip is adapted through deformation of said elastically deformable virtual hinge to cooperate in a sliding manner with a given amount of axial interference with the sealing surface.

2. The sealing assembly as claimed in claim 1, wherein said annular sealing member also comprises an annular spur projecting axially from said first annular face of said annular sealing member and located radially outwards with respect to said first and second axial sealing lips, said annular spur having at least one radial slit permitting passage of fluid through the annular spur.

3. The sealing assembly as claimed in claim 2, wherein said annular spur projects axially from said root portion of said annular sealing member.

4. The sealing assembly as claimed in claim 3, wherein a circumferential edge of said annular sealing member is defined, when undeformed, by a substantially cylindrical surface that is adapted to be coaxial with a relative rotation axis of the mechanical members.

5. A combination of a sealing assembly and first and second mechanical members connected for relative rotation, comprising:

a substantially rigid shield carried integrally by the first mechanical member;

an annular sealing member projecting radially from said shield and comprising a first axial sealing lip and a second axial sealing lip, said first and second axial sealing lips both projecting axially from a first annular face of said annular sealing member, said first annular face of the annular sealing member facing a sealing surface on the second mechanical member, said first and second axial sealing lips cooperating in a sliding manner with the sealing surface of the second mechanical member;

said annular sealing member comprising a root portion projecting radially from said shield, an end portion projecting axially at a free radial end of said annular sealing member, and an intermediate portion extending radially between said root portion and said end portion, said intermediate portion being connected to said root portion by a narrow section defining only a single elastically deformable virtual hinge;

said annular sealing member being substantially T-shaped, said end portion projecting axially on opposite sides of said free radial end of said annular sealing member, and having an axial extension greater than the axial extension of said intermediate portion of said annular sealing member;

said first axial sealing lip being defined by a rounded first axial end of said end portion of said annular sealing member, said second axial sealing lip projecting axially from said intermediate portion of said annular sealing member;

said single elastically deformable virtual hinge allowing said annular sealing member to selectively assume a first operating position when said first annular face of said annular sealing member is subjected to a pressure substantially equal to the pressure on a second annular face of said annular sealing element that is opposite said first annular face of said annular sealing member, and a second operating position when said first annular face is subjected to a pressure significantly lower than the pressure on said second annular face;

said first axial sealing lip mating in an axially interfering manner with said sealing surface in the first operating position of the annular sealing member while said second axial sealing lip mates substantially without axial interference with said sealing surface when the annular sealing member is in the first operating position to permit fluid passage between said second axial sealing lip and said sealing surface; and said second axial sealing lip cooperating in a sliding manner, and with axial interference, with said sealing surface through deformation of said elastically deformable virtual hinge when the annular sealing member is in the second operating position.

6. The combination as claimed in claim 5, wherein said sealing surface is defined by a substantially flat annular side of a circumferential seat formed on a lateral surface of the second mechanical member, said circumferential seat being substantially perpendicular to a relative rotation axis of said first and second mechanical members, a bottom surface of said circumferential seat having a shaped projection so that, in radial section, the bottom surface has an undulating, substantially S-shaped contour blending with said sealing surface, said annular sealing member also comprising at said free radial end a circumferential edge radially facing said bottom surface of said circumferential seat.

7. The sealing device as claimed in claim 6, wherein said annular sealing member also comprises an annular spur projecting axially from said first annular face of said annular sealing member towards said sealing surface, the annular spur being located radially outwards with respect to said first and second axial sealing lips, said annular spur having at least one radial slit permitting passage of fluid through the annular spur.

8. The sealing device as claimed in claim 7, wherein said annular spur projects axially from said root portion of said annular sealing member.

9. The sealing device as claimed in claim 8, wherein said circumferential edge of said annular sealing member is defined, when undeformed, by a substantially cylindrical surface that is adapted to be coaxial with the relative rotation axis of the mechanical members.

10. The sealing device as claimed in claim 5, wherein said annular sealing member also comprises an annular spur projecting axially from said first annular face of said annular sealing member towards said sealing surface, the annular spur being located radially outwards with respect to said first and second axial sealing lips, said annular spur having at least one radial slit permitting passage of fluid through the annular spur.

11. The sealing device as claimed in claim 10, wherein said annular spur projects axially from said root portion of said annular sealing member.

* * * * *